US006885347B2

(12) United States Patent
Zheng et al.

(10) Patent No.: US 6,885,347 B2
(45) Date of Patent: Apr. 26, 2005

(54) METHOD FOR ASSEMBLING ANTENNA ONTO PLASTIC BASE

(75) Inventors: Qisheng Zheng, Kunsan (CN); Shaoping Du, Kunsan (CN); Kai Lu, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 79 days.

(21) Appl. No.: 10/629,233

(22) Filed: Jul. 28, 2003

(65) Prior Publication Data

US 2005/0024270 A1 Feb. 3, 2005

(51) Int. Cl.[7] .......................... H01Q 1/24; B23B 5/28
(52) U.S. Cl. .......................... 343/702; 343/700 MS; 29/600
(58) Field of Search .......................... 343/700 MS, 702; 29/600

(56) References Cited

U.S. PATENT DOCUMENTS 5,929,813 A * 7/1999 Eggleston ............ 343/700 MS
6,271,794 B1 * 8/2001 Geeraert .............. 343/700 MS
6,333,716 B1 * 12/2001 Pontoppidan ............... 343/702
6,437,747 B1 * 8/2002 Stoiljkovic et al. ......... 343/702
6,448,932 B1 * 9/2002 Stoiljkovic et al. .. 343/700 MS
6,486,837 B2 * 11/2002 Spiegel et al. .............. 343/702
6,639,560 B1 * 10/2003 Kadambi et al. .... 343/700 MS
6,741,214 B1 * 5/2004 Kadambi et al. .... 343/700 MS

* cited by examiner

*Primary Examiner*—Tan Ho
(74) *Attorney, Agent, or Firm*—Wei Te Chung

(57) ABSTRACT

A method for assembling a PIFA antenna (20) onto a plastic base of a handle electronic device includes forming the plastic base (30) with a number of posts (35) by a single-shot-molding process and punching a number of pinholes (215) on the PIFA antenna body corresponding to the posts protruding thereon. The plastic base and the antenna body are conjoined together with the posts aligned with the pinholes. Then the posts are heated and then transfigured to flat-shape for engaging the edges of the pinholes. Thus the PIFA antenna is firmly retained on the plastic base.

11 Claims, 3 Drawing Sheets

METHOD FOR ASSEMBLING ANTENNA ONTO PLASTIC BASE

BACKGROUND OF THE INVENTION

1. Field of the Invention

The present invention relates to a method for assembling an antenna in an electronic device, and in particular to a method for assembling an antenna onto a plastic base of a handheld electronic device.

2. Description of the Prior Art

PIFA (planar inverted-F antenna) antennas have been introduced as internal antennas for handheld electronic devices such as mobile phones. Most of these PIFA antennas formed in metal sheets cover plastic bases to fabricate plastic antenna assemblies mounted into the electronic devices. Now shot molding is a popular method in manufacturing a plastic antenna assembly. For instance, U.S. Pat. No. 6,333,716 discloses a two-shot molding process comprising molding a dielectric base structure with a first and second plastic materials and a plating process. The first plastic material forming a mounting base is not plateable. The second plateable plastic material forms a plateable base mounted on the mounting base. Then a metal-sheet antenna is plated on the plateable base in the plating process. However, this process requires a high precision in manufacturing which results in a high cost.

Furthermore, U.S. Pat. No. 6,486,837 discloses a single-shot-molding process and an electro-plating process. A plateable base is formed in the single-shot-molding process. Then the plateable base is put into an electro-plating bath that is electrically coupled. In the electro-plating process, a copper or nickel alloy is covered to the plateable base. However, the electro-plating process is also complex for assembling the antenna on the plastic base.

Hence, an improved method for manufacturing a plastic antenna assembly is desired to overcome the above-mentioned shortcomings of existing method.

SUMMARY OF THE INVENTION

A primary object, therefore, of the present invention is to provide a heat-melt process to assemble an antenna onto a plastic base.

A method according to the present invention for assembling an antenna body onto a plastic base comprises forming the plastic base with a plurality of posts protruding thereon, punching a plurality of pinholes on the antenna body corresponding to the posts, conjoining the plastic base and the antenna body to have the posts get through the pinholes and thermal deforming the posts to engage edges of the pinholes. Then the holes will firmly retain the antenna on the plastic base.

Other objects, advantages and novel features of the invention will become more apparent from the following detailed description of a preferred embodiment when taken in conjunction with the accompanying drawings.

DETAILED DESCRIPTION OF THE INVENTION

Reference will now be made in detail to a preferred embodiment of the present invention.

Figure 3:
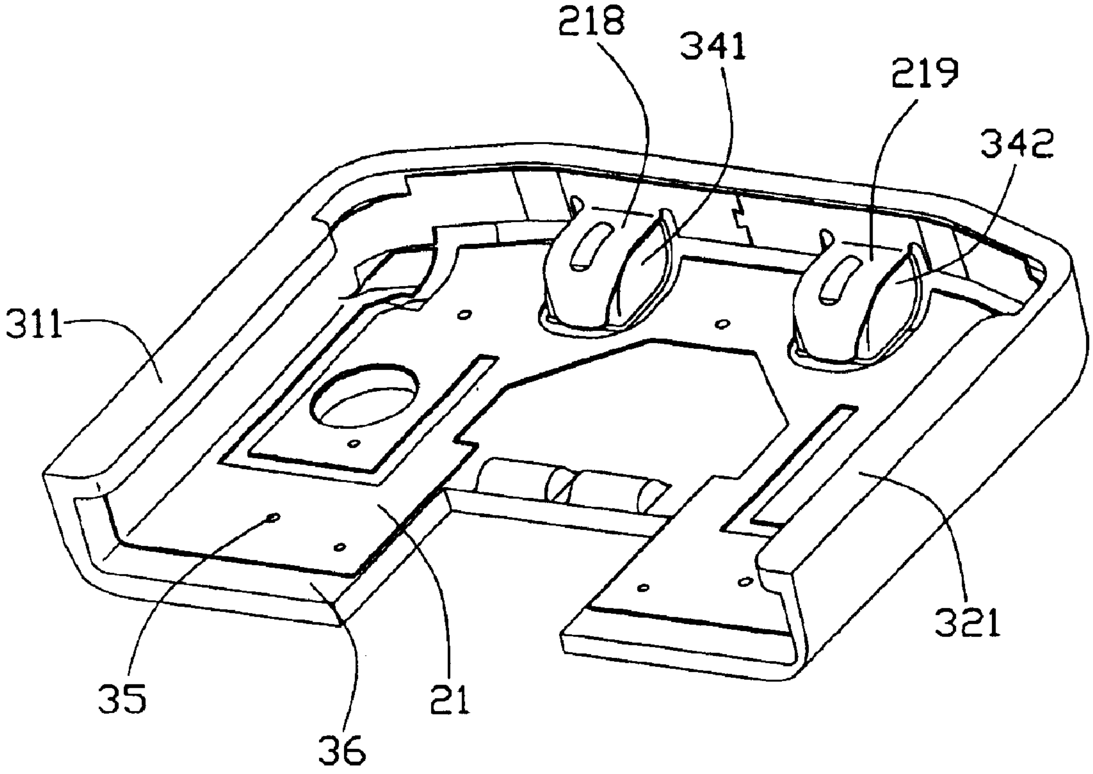
FIG. 3 is a assembled view of the metal-sheet antenna of the FIG. 1 assembled on the plastic base of FIG. 2.

Referring to FIG. 3, an antenna assembly 10 in accordance with a preferred embodiment of the present invention comprises a multi-band PIFA antenna 20 and a plastic base 30. The antenna assembly 10 is mounted into an electronic device (not shown) as an internal antenna assembly.

Figure 1:
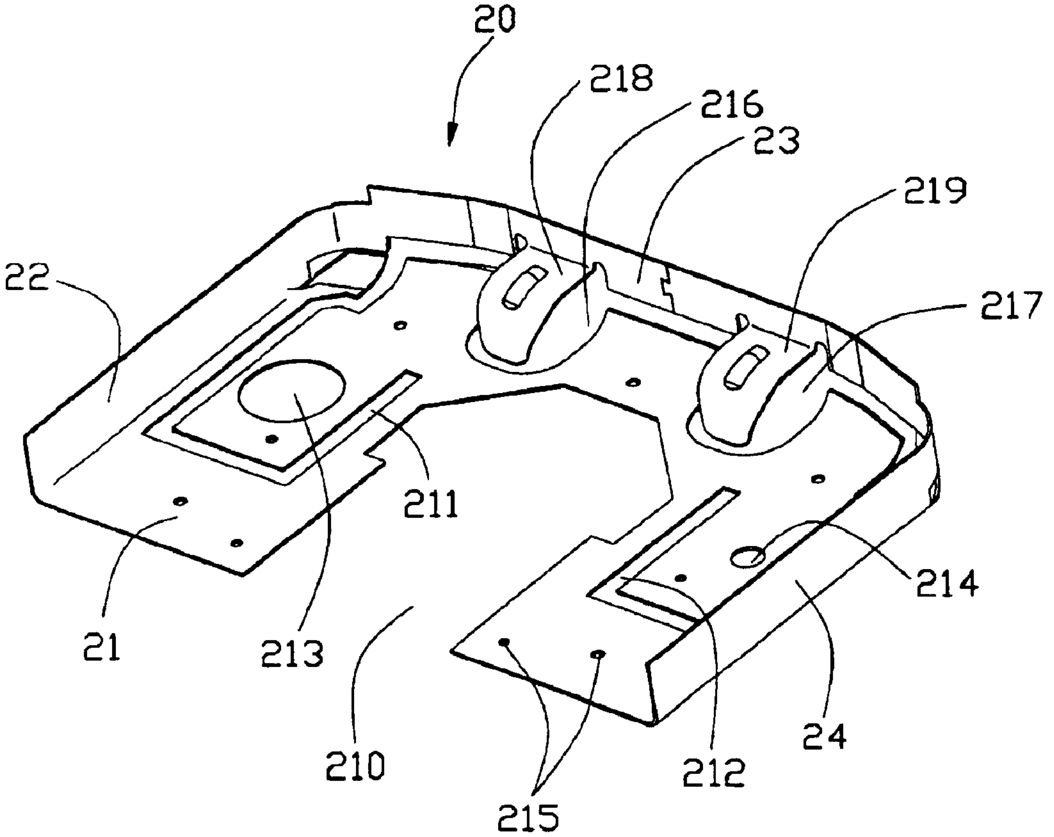
FIG. 1 is a perspective view of a metal-sheet antenna as a part of a preferred embodiment in accordance with the present invention.

Referring to FIG. 1, The multi-band PIFA antenna 20 is made of sheet metal and has a rectangular bottom 21 and a first, second and third elongate sidewalls 22, 23, 24. The first, second and third sidewalls 22, 23, 24 respectively perpendicularly connected with a first, second and third edges (not labeled) of the bottom 21. A notch 210 is defined in a fourth edge (not labeled) of the bottom 21. A first meander slot 211 and a second meander slot 212 are both defined in the bottom 21 and respectively extend adjacently to the notch 210. The first and second slots 211, 212 allow the PIFA antenna 20 to operate at two frequency bands such as GSM900/1800. Furthermore, adjusting the configuration of the first and second slots 211, 212 will change the bandwidth and gain of the PIFA antenna 20. A first hole 214 and a second hole 213 for mounting the antenna assembly 10 onto the electronic device are defined beside the notch 210. A first and second cutouts 216, 217 are defined adjacently to the sidewall 23 and communicate with the first and second slots 211, 212. A plurality of pinholes 215 are symmetrically defined in the bottom 21 of the PIFA antenna 20. A first and second elastic feeder sheets 218, 219 corresponding to the first and second cutouts 216, 217 extend from the second sidewall and have a pair of ridges (not labeled) on lower surfaces thereof for connecting with the electronic device.

Figure 2:
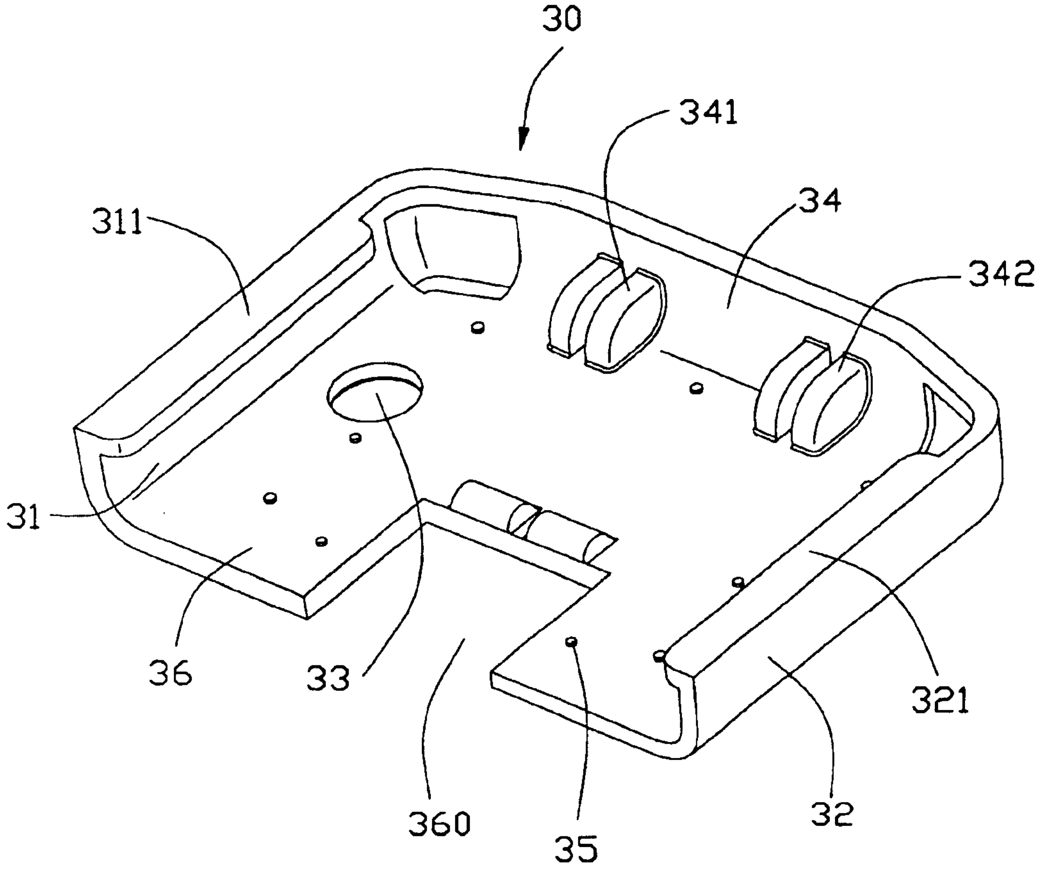
FIG. 2 is a perspective view of a plastic base as another part of the preferred embodiment in accordance with the present invention.

Referring to FIG. 2, the plastic base 30 formed by a single-shot-molding process having a similar profile with the PIFA antenna 20 comprises a notch 360, a plastic bottom 36, a first, second and third sidewalls 31, 32, 34, an eyelet 33 having same diameter with the second hole 213 of the PIFA antenna 20 and a pair of retain portion 341, 342 getting through the first and second cutouts 216, 217 to cooperate with the two ridges of the first and second feeder sheets 218, 219. a pair of flanges 311, 321 extend inside from the first and sidewall 31, 32 of the plastic base 30 for retaining the PIFA antenna 20. The plastic base 30 formed by single shot molding comprises a plurality of posts 35 on the plastic bottom 36 as counterparts to the pinholes 215 of the antenna 20.

In assembling process, the plastic base 30 is conjoined with the PIFA antenna 20 with the posts 35 aligned with the pinholes 215. Then the posts 35 are heated and transfigured into flat-shape configuration. The thermal deforming process may be implemented by blowing high temperature air or other known preferred art in this field. Then the flat-shape posts 35 will cover around edges of the pinholes 215 and firmly retain the PIFA antenna 20 on the plastic base 30 after the flat-shape posts 35 are cooled.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for assembling an antenna body onto a plastic base, comprising the steps of:

forming the plastic base with a plurality of posts protruding thereon;

punching a plurality of pinholes on the antenna body corresponding to the posts;

conjoining the plastic base and the antenna body to align the posts with the pinholes; and thermal deforming the posts to engage edges of the pinholes.

2. The method as claimed in claim 1, wherein the plastic base is formed by a single-shot molding.

3. The method as claimed in claim 2, wherein the antenna body is in a PIFA structure.

4. The method as claimed in claim 3, wherein the antenna body comprises a first and a second elastic metal feeder sheets.

5. The method as claimed in claim 4, wherein the plastic base comprises two retaining portions cooperating with the first and the second feeder sheets respectively.

6. The method as claimed in claim 5, wherein the plastic base and the antenna body form an antenna assembly for mounting into an electronic device.

7. The method as claimed in claim 6, wherein the plastic base comprises a pair of flanges for retaining the antenna body.

8. An antenna assembly comprising:

an antenna stamped and formed from a sheet metal, said antenna essentially defining a planar bottom with at least one side extending upwardly from an edge of the bottom; and an insulative base including a planar bottom wall covering said bottom of the antenna, with at least one side wall extending from an edge of said bottom wall and covering said one side of the antenna, thereby said base substantially located at and compliantly and protectively covering an exterior side of said antenna; wherein interengaging attachment occurs between the antenna and the base.

9. The antenna assembly as claimed in claim 8, wherein said interengaging attachment occurs between the bottom of the antenna and the bottom wall of the base.

10. The antenna assembly as claimed in claim 9, wherein a plurality of deformable posts are formed on the bottom wall of the base facing to the antenna and extending through corresponding through holes in the bottom of the antenna and further deformed at tips thereof to securely assemble both the base and the antenna together.

11. An antenna assembly comprising:

an antenna stamped and formed from a sheet metal, said antenna essentially defining a planar bottom with at least one side extending upwardly from an edge of the bottom; and an insulative base including a planar bottom wall covering said bottom of the antenna, with at least one side wall extending from an edge of said bottom wall and covering said one side of the antenna, thereby said base substantially located at and compliantly and protectively covering an exterior side of said antenna; wherein said antenna defines a cutout around a corner between said bottom and said side thereof with a feeder sheet extending from an edge of said cutout, and the base defines a retaining projection received in said cutout and compliantly covered by said feeder sheet.

* * * * *